UNITED STATES PATENT OFFICE.

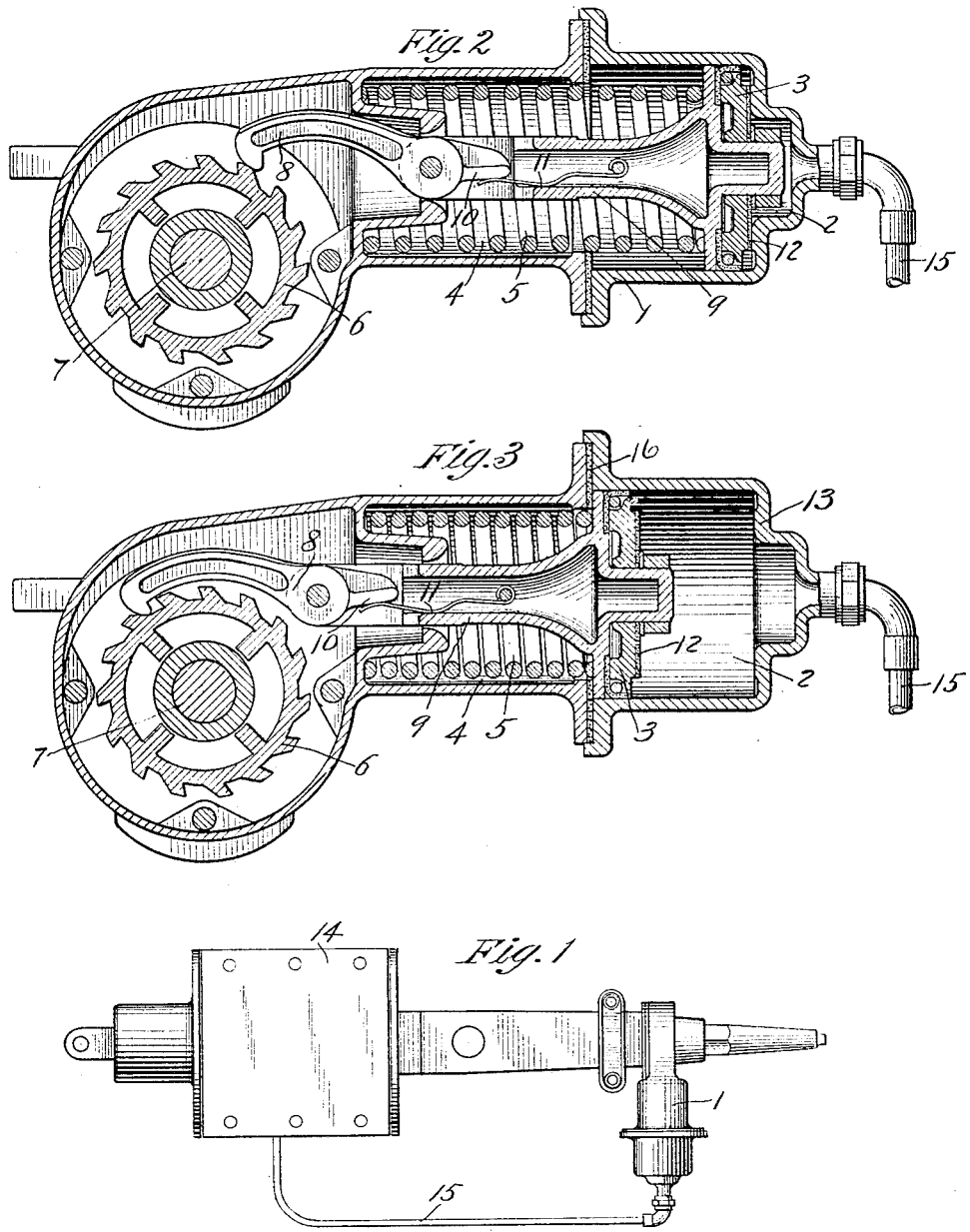

ROBERT E. ADREON, OF ST. LOUIS, MISSOURI, ASSIGNOR TO THE AMERICAN BRAKE COMPANY, OF EAST ST. LOUIS, ILLINOIS, A CORPORATION OF ILLINOIS.

AUTOMATIC SLACK-ADJUSTER.

1,120,640.  Specification of Letters Patent.  Patented Dec. 8, 1914.

Application filed September 21, 1911. Serial No. 650,624.

*To all whom it may concern:*

Be it known that I, ROBERT E. ADREON, a citizen of the United States, residing at St. Louis, in the county of St. Louis and State of Missouri, have invented new and useful Improvements in Automatic Slack-Adjusters, of which the following is a specification.

This invention relates to fluid pressure brakes, and more particularly to a slack adjuster adapted to automatically take up the slack caused by wear of the brake shoes and in the brake rigging.

Where the slack adjuster is of the type in which a pawl is employed for operating a ratchet nut to take up the slack, it has heretofore been the practice to provide a projection on the pawl adapted upon the return stroke of the slack adjuster piston to engage the casing and thereby serve to arrest the movement of the piston, the engagement of the pawl also operating to throw the pawl out of engagement with the ratchet nut. This method of limiting the return stroke of the adjuster piston is objectionable in some cases because of the noise produced.

One object of my invention is therefore to provide a noiselessly operating means for arresting the return movement of the slack adjuster piston.

When the pawl is out of engagement with the ratchet nut the ratchet nut is sometimes liable to turn, where there is insufficient friction between the parts to maintain the same stationary.

Another object of my invention is to provide means for preventing accidental movement of the ratchet nut In the accompanying drawing, Figure 1 is a plan view of a brake cylinder with my improved slack adjuster applied thereto; Fig. 2 a central sectional view of a slack adjuster embodying my invention, showing the parts in normal position; and Fig. 3 a similar view, showing the parts in position for rotating the ratchet nut to take up slack.

As shown in the drawing, the slack adjuster may comprise a casing 1, having a piston chamber 2 containing a slack adjuster piston 3, having a chamber 4 on the opposite side of the piston 3 containing a coil spring 5 adapted to act on said piston. In the casing 1 is also mounted a bushed ratchet nut 6 for operating the slack adjusting screw 7.

A pawl 8 is adapted to engage the teeth of the ratchet nut 6 and is pivotally mounted on the end of piston stem 9 carried by piston 3. Said pawl is provided with an inwardly projecting arm 10 having a flat spring 11 bearing against its face in a direction tending to press the pawl 8 against the ratchet nut 6. The inner face of the piston 3 is provided with a leather gasket 12 adapted upon the return stroke of the piston to engage the end wall 13 of the casing 1 and thereby check the inward movement of the piston.

It will now be evident that when the piston 3 is in the normal position shown in Fig. 2, the pawl 8 bears against the ratchet nut 6 with a pressure dependent on the tension of the spring 11, which is sufficient to prevent the accidental turning of the ratchet nut. When the brake cylinder piston in brake cylinder 14 moves out, in applying the brakes, beyond the port opening leading to pipe 15, air is supplied from the brake cylinder to the piston chamber 2 and the piston 3 is shifted to the position shown in Fig 3. In this position the piston 3 engages a gasket 16, clamped between the flanges of the piston cylinder and the spring casing, so that possible leakage from the brake cylinder to the atmosphere is prevented. Upon releasing the brakes, air is also released from piston chamber 2 and the piston 3 is returned to its inner position by the spring 5, the pawl 8 rotating the ratchet nut 6 to take up the slack. The return movement of the piston is arrested by the engagement of the leather gasket 12 with the end wall 13 of the casing 1, so that the return movement is noiselessly effected.

Having now described my invention, what I claim as new and desire to secure by Letters Patent, is:—

1. In an automatic slack adjuster, the combination with a casing, a piston therein, a ratchet nut for taking up slack, and a pawl operated by said piston for actuating said nut, of means for yieldingly pressing said pawl against the ratchet nut in normal position and a non-metallic gasket carried by the piston for arresting the movement of the piston.

2. In an automatic slack adjuster, the combination with a casing, a piston therein, a ratchet nut for taking up slack, and a pawl operated by said piston for actuating said nut, of means for yieldingly pressing said pawl against the ratchet nut in normal position, a gasket for making a tight joint upon the movement of the piston in one direction and a gasket carried by the piston for arresting the movement of the piston in the opposite direction.

In testimony whereof I have hereunto set my hand.

ROBERT E. ADREON.

Witnesses:
CHAS. E. WALL, Jr.,
E. A. EMERY.

Copies of this patent may be obtained for five cents each, by addressing the "Commissioner of Patents, Washington, D. C."